(12) United States Patent
Allweil et al.

(10) Patent No.: US 8,296,418 B2
(45) Date of Patent: Oct. 23, 2012

(54) OPTIMIZED MODIFICATION OF A CLUSTERED COMPUTER SYSTEM

(75) Inventors: Claus Allweil, Stuttgart (DE); Frank Heimes, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 263 days.

(21) Appl. No.: 12/356,990

(22) Filed: Jan. 21, 2009

(65) Prior Publication Data

US 2009/0187606 A1    Jul. 23, 2009

(30) Foreign Application Priority Data

Jan. 21, 2008   (DE) .................................... 08150441

(51) Int. Cl.
*G06F 15/173*   (2006.01)

(52) U.S. Cl. ......................... 709/224; 709/225; 709/227

(58) Field of Classification Search .................. 709/224, 709/225, 227

See application file for complete search history.

(56) References Cited

U.S. PATENT DOCUMENTS

| | | | |
|---|---|---|---|
| 5,860,137 A | 1/1999 | Raz et al. | |
| 6,067,545 A | 5/2000 | Wolff | |
| 6,101,495 A | 8/2000 | Tsuchida et al. | |
| 6,192,359 B1 | 2/2001 | Tsuchida et al. | |
| 6,230,183 B1 | 5/2001 | Yocom et al. | |
| 6,321,238 B1 | 11/2001 | Putzolu | |
| 6,405,284 B1 | 6/2002 | Bridge | |
| 7,167,854 B2 | 1/2007 | Maciel et al. | |
| 7,395,537 B1 * | 7/2008 | Brown et al. | 718/104 |
| 7,761,587 B2 * | 7/2010 | Kim et al. | 709/230 |
| 2005/0154731 A1 | 7/2005 | Ito et al. | |

* cited by examiner

*Primary Examiner* — Adnan Mirza
(74) *Attorney, Agent, or Firm* — Stephen E. Bach

(57) ABSTRACT

A method, program product, and data processing system are provided for modifying a cluster in a data processing system, the cluster comprising a plurality of nodes. A monitoring unit monitors resource usage over at least one cycle of a periodic timeframe to obtain monitored resource usage data. A forecasting component forecasts resource usage over a future cycle of the periodic timeframe using the monitored resource usage data to obtain forecast resource usage data. An analysis component analyzes the forecast resource usage data using at least a first rule to determine whether a modification of the cluster is necessary and at least a second rule to determine a time window for the modification of the cluster. A modification component modifies the cluster by adding or removing a node to the plurality of nodes in the time window.

19 Claims, 4 Drawing Sheets

OPTIMIZED MODIFICATION OF A CLUSTERED COMPUTER SYSTEM

FIELD OF INVENTION

The invention relates to a method, computer program product and data processing system for the modification of a clustered computer system.

BACKGROUND

Clustered computer systems are often deployed to improve performance and/or availability over that provided by a single computer, and are often more cost-effective than single computers of comparable speed or availability.

For example, a database cluster may comprise a number of database servers which together make up a complete database system. The individual servers may be referred to as nodes. A number of different types of database cluster exist, such as, a shared disk cluster (also called a shared everything cluster) and a shared nothing cluster. In a shared disk or shared everything cluster, a number of nodes have access to all the data on a shared set of disks. In a shared nothing cluster, each node is independent and self sufficient. Each node has access to its own subset of the data. In a shared nothing cluster, queries may need to be split, distributed to all nodes and combined afterwards.

In database clusters such as shared nothing clusters, nodes may need to be added or removed depending on system resources. The size of a shared nothing cluster is a parameter which is closely related to the CPU load on the cluster. Resource requirements may change over time. As resource requirements change, restructuring of the nodes may be required. In the event that a bottleneck is reached, new nodes are manually added. The restructuring of a clustered database is a task manually undertaken by a system administrator. Additionally, the restructuring of a clustered database may have an impact on the availability of the database and result in an amount of downtime for the database system.

SUMMARY OF THE INVENTION

The present invention is directed to a method, a computer program product, and a data processing system as defined in the independent claims. Further embodiments of the invention are described in the dependent claims.

According to an embodiment of the present invention, there is provided a method of modifying a cluster in a data processing system. The cluster comprises a plurality of nodes. The method comprises monitoring resource usage over at least one cycle of a periodic timeframe to obtain monitored resource usage data. The method further comprises forecasting resource usage over a future cycle of the periodic timeframe using the monitored resource usage data to obtain forecast resource usage data. The method further comprises analyzing the forecast resource usage data using at least a first rule to determine whether a modification of the cluster is necessary and at least a second rule to determine a time window for the modification. The method further comprises performing the modification of the cluster by adding or removing a node to the plurality of nodes in the time window.

Embodiments of the present invention are advantageous because forecast resource usage data is determined, allowing the modification of the cluster to take place before a bottleneck occurs. Further, a time window can be determined for the modification to minimize the impact of any system downtime.

According to an embodiment of the present invention, the method further comprises the step of providing a suggested timeframe for the modification to the user.

According to an embodiment of the present invention, the first rule comprises a first threshold value of the resource usage, and the modification of the cluster is deemed necessary if a value of the forecast resource usage exceeds the first threshold.

According to an embodiment of the present invention, the first rule further comprises a first time period, and the modification of the cluster is deemed necessary if the forecast resource usage exceeds the first threshold for at least the first time period.

According to an embodiment of the present invention, the second rule comprises a second threshold value of the resource usage and a second time period. The time window is determined as a part of the forecast resource usage data where the resource usage is below the second threshold for at least the second time period.

According to an embodiment of the present invention, the cluster is a shared nothing cluster.

According to an embodiment of the present invention, there is provided a computer program product stored on a computer useable medium. The computer program product comprises computer readable program means for causing a computer to perform a method in accordance with the present invention.

According to an embodiment of the present invention, there is provided a data processing system for modifying a cluster. The cluster comprises a plurality of nodes. The data processing system comprises means for monitoring resource usage over at least one cycle of a periodic timeframe to obtain monitored resource usage data. The data processing system further comprises means for forecasting resource usage over a future cycle of the periodic timeframe using the monitored resource usage data to obtain forecast resource usage data. The data processing system further comprises means for analyzing the forecast resource usage data using at least a first rule to determine whether a modification of the cluster is necessary and at least a second rule to determine a time window for the modification. The data processing system further comprises means for performing the modification of the cluster by adding or removing a node to the plurality of nodes in the time window.

According to an embodiment of the present invention, there is provided a data processing system for modifying a cluster. The cluster comprises a plurality of nodes. The data processing system comprises a monitoring component for monitoring a resource usage over at least one cycle of a periodic timeframe to obtain monitored resource usage data. The data processing system further comprises a forecasting component for forecasting resource usage over a future cycle of the periodic timeframe using the monitored resource usage data to obtain forecast resource usage data. The data processing system further comprises storage for a first rule and a second rule. The data processing system further comprises an analysis component for analyzing the resource usage data using the first rule to determine whether a modification of the cluster is necessary and using the second rule to determine a time window for the modification of the cluster. The data processing system further comprises a modification component for performing the modification of the cluster by adding or removing a node to the plurality of nodes in the time window.

BRIEF DESCRIPTION OF THE DRAWINGS

In the following, embodiments of the invention will be described, in greater detail, by way of example only, making reference to the drawings in which.

DETAILED DESCRIPTION

Figure 1:
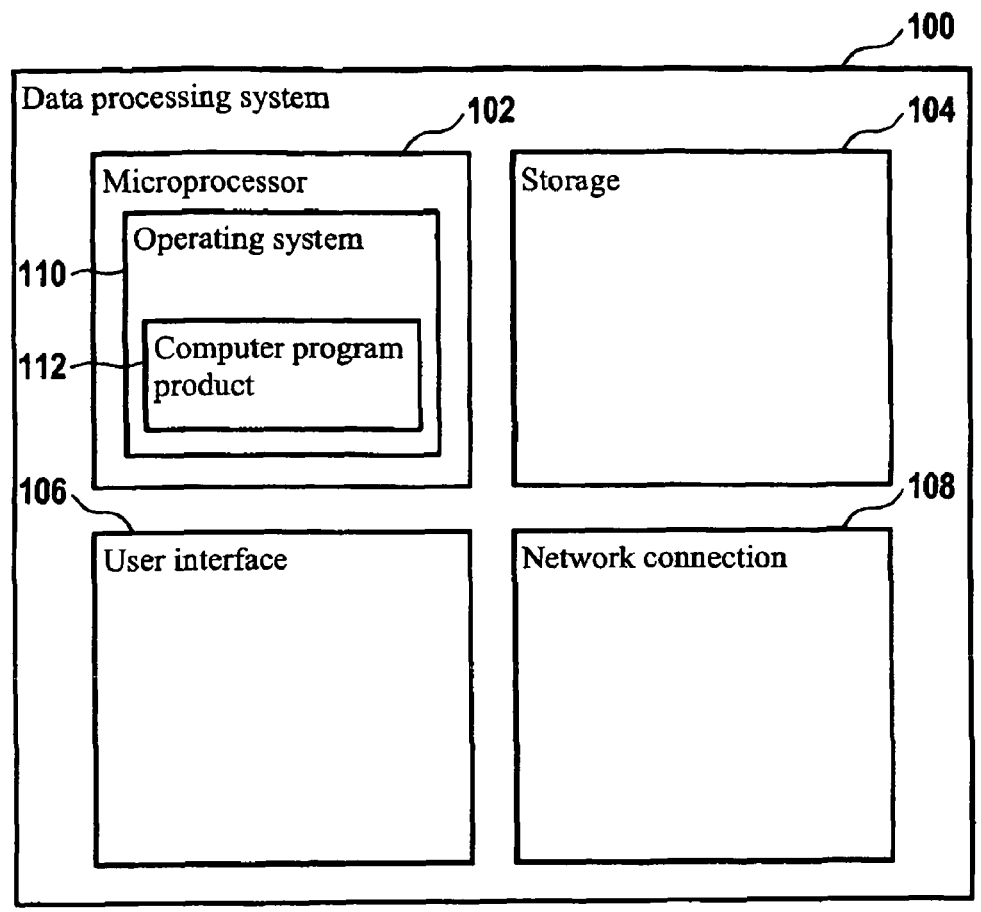
FIG. 1 shows a block diagram of a data processing system according to at least one embodiment of the present invention.

FIG. 1 shows a block diagram of a data processing system 100. Data processing system 100 comprises a microprocessor 102, a storage 104 (i.e., data storage), a user interface 106 and a network connection 108. Microprocessor 102 executes operating system 110. Operating system 110 is used to execute computer program product 112. The codes of the operating system 110 and of the computer program product 112 are stored on the storage 104 and loaded for execution onto the microprocessor 102.

Computer program product may be regarded as a tool for monitoring and forecasting resource usage on a cluster and for modifying the cluster as a result of the forecast resource usage.

Computer program product 112 may be implemented as a database management application, or alternatively computer program product 112 may be implemented as an add-on for an existing monitoring product or application.

Figure 2:
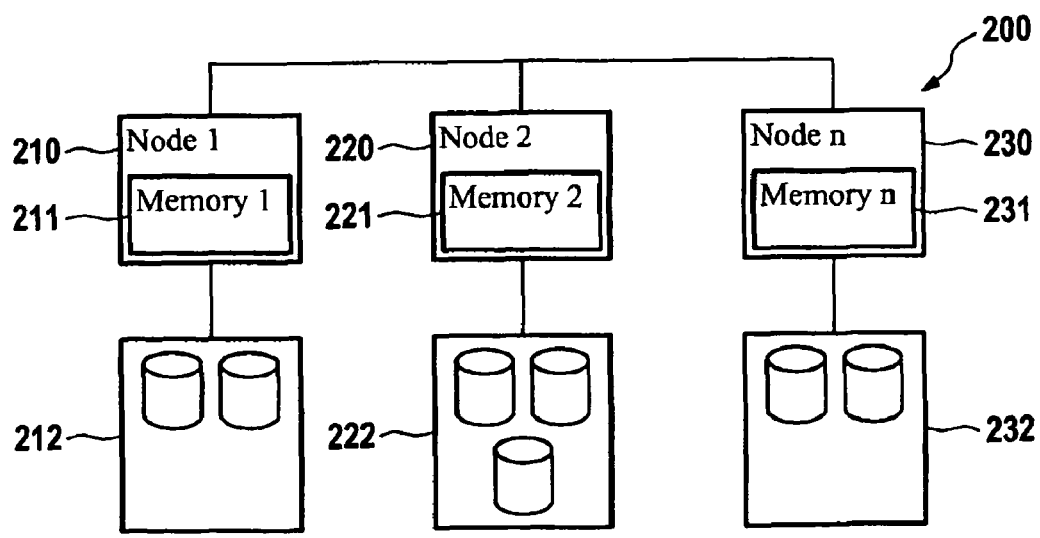
FIG. 2 shows a block diagram of a database cluster according to at least one embodiment of the present invention.

FIG. 2 shows an example of a database cluster. Database cluster 200 comprises node 1 210, node 2 220 and node n 230. Node 1 has memory 211 and disks 212. Node 2 has memory 221 and disks 222. Node n has memory 231 and disks 232. Database cluster 200 is a shared nothing cluster; each of the nodes has its own disks.

Figure 3:
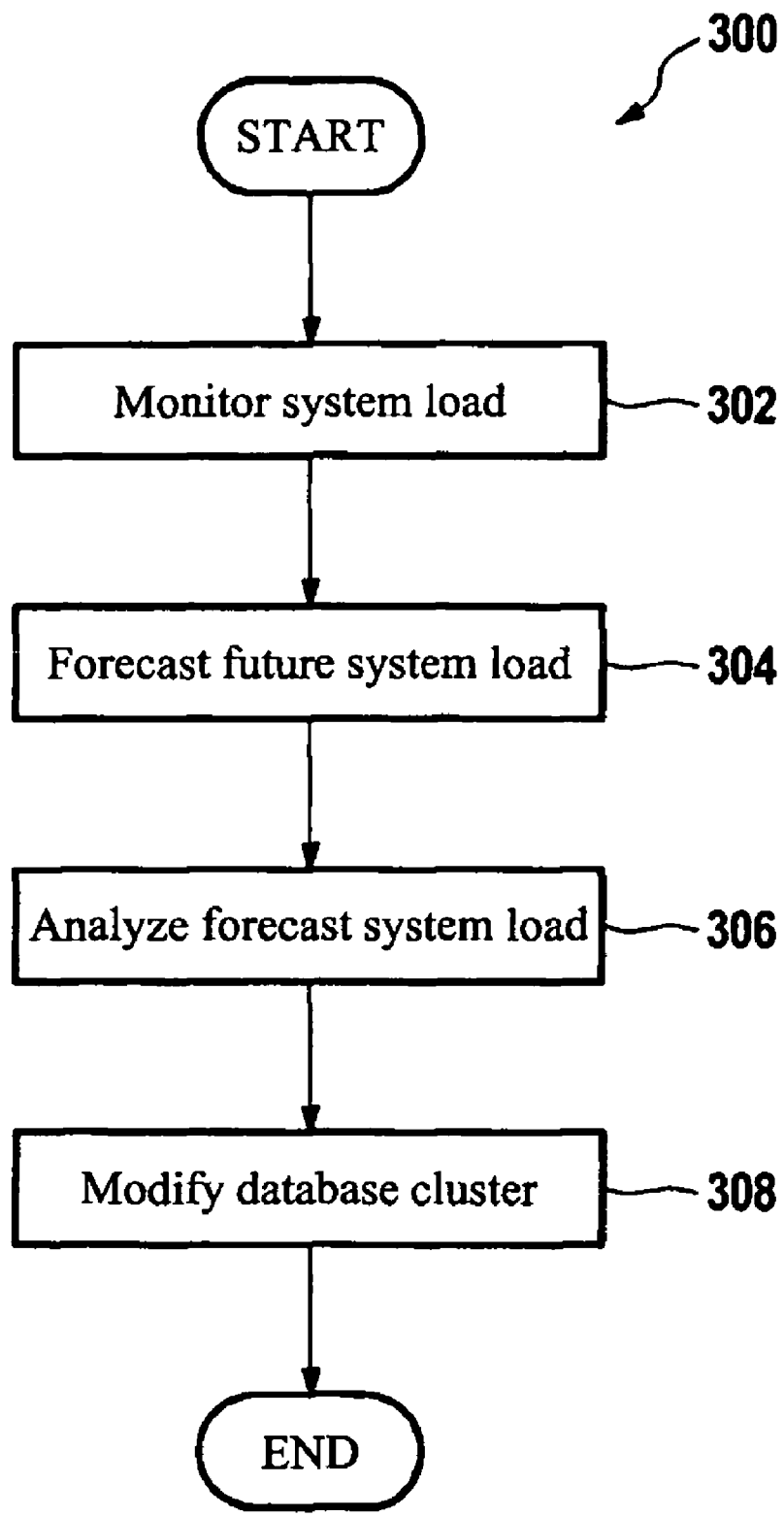
FIG. 3 shows a flow diagram illustrating steps in a method of modifying a database cluster according to at least one embodiment of the present invention.

FIG. 3 is a flow diagram illustrating a method 300 for modifying a database cluster such as that shown in FIG. 2. In step 302, system load is monitored. The system load is monitored over a cycle or a number of cycles of a periodic timeframe. In step 304, future system load is forecast. The monitored system load from step 302 is used to forecast system load for a future cycle of the periodic timeframe. In step 306, the forecast system load is analyzed. The analysis may comprise comparing the forecast system load with a number of thresholds and rules to determine whether a modification of the database cluster will be required in the next cycle and to determine a suitable time window for the modification. In step 308, the database cluster is modified by adding or removing a node from the database cluster in the time window determined in step 306.

Figure 4:
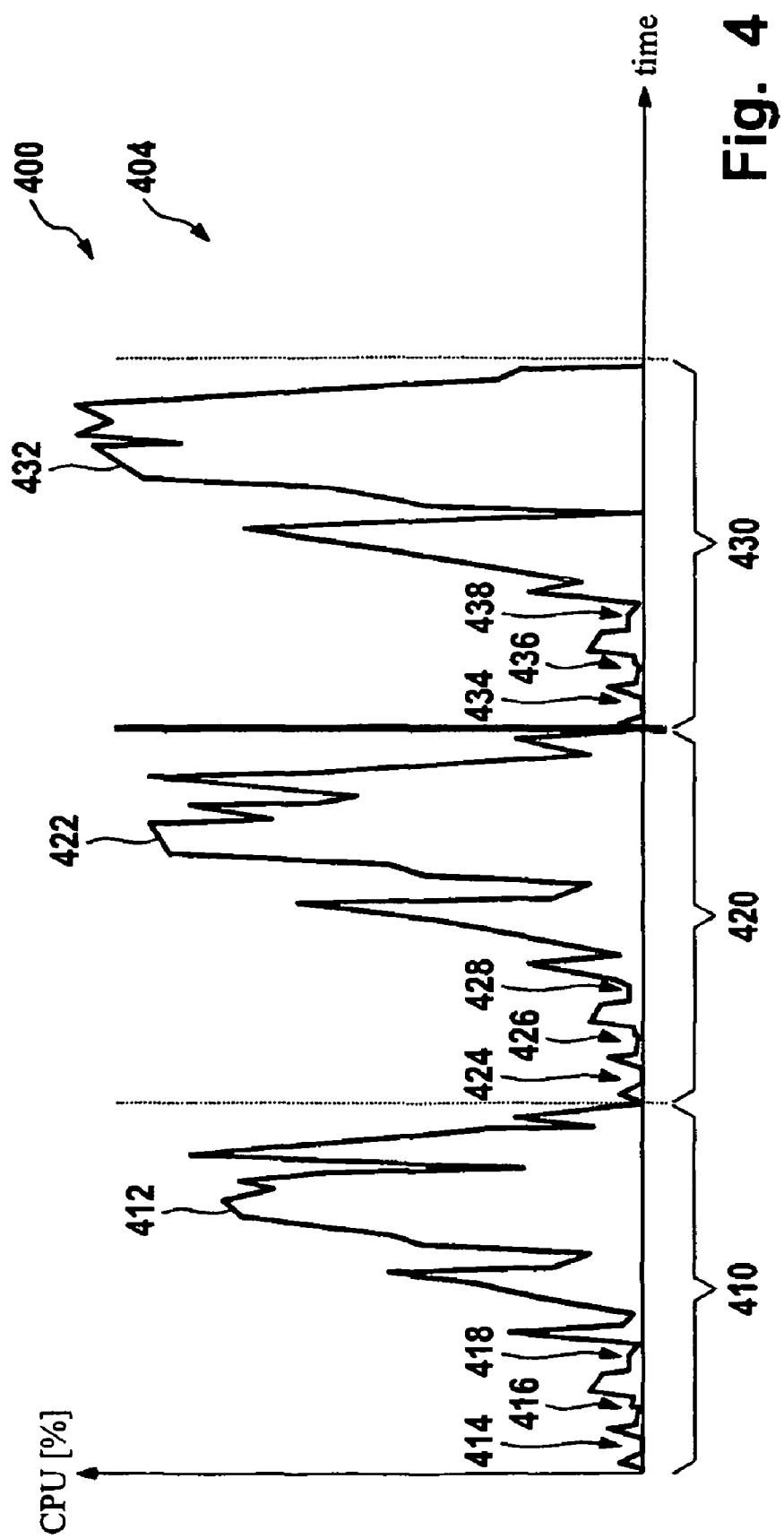
FIG. 4 shows an exemplary graph of system load against time according to at least one embodiment of the present invention.

FIG. 4 illustrates a graph 400 showing system load against time. The system load exhibits a cyclic property. In FIG. 4, three periods 410, 420 and 430 of a cyclic timeframe are shown. For the purposes of this example, 410 and 420 are considered to be in the past and 430 is considered to be in the future. Many information technology systems depend on a specific period; this period may be a daily period, a weekly period, a quarterly period, or other period. The actual length of the period is not of great importance; it may be defined by a user, or be extracted from observation and analysis of the system load data. What is of greater importance is the observation that if an information technology system exhibits a periodic cycle, this cycle can then be used to forecast a future period.

The cycle shown in FIG. 4 has low system load at times 414, 416 and 418 and a peak load 412 in cycle 410. Cycle 420 exhibits similar properties; low load at 424, 426 and 428 and a peak at 422. Additionally the height of the respective peaks 412 and 422 increases. This data can be used to forecast cycle 430; low load at 434, 436 and 4387 and a peak at 432.

FIG. 4 also shows threshold 404. Threshold 404 may be set by a user as for example 100% CPU load or a lower figure. Threshold 404 represents a bottleneck value for system load. Using the occurrences of peaks 412 and 422, the height of peak 432 can be predicted. Therefore, the analysis of periods 410 and 420 would lead to the conclusion that threshold 404 would be reached during cycle 430. Analysis of cycles 410 and 420 can further be used to forecast time windows during cycle 430 in which system load is low, for example 434, 436 and 438. Thus, a modification of the database cluster can be carried out during a time window in which the impact of any downtime is minimized.

While in the above example explained with reference to FIGS. 2, 3 and 4, the monitored resource is system load, resource usages other than CPU load may be considered, for example hard disk usage, number of transactions per second, memory consumption and other monitorable system resources known to a person of skill in the art may be used in place of system load.

Figure 5:
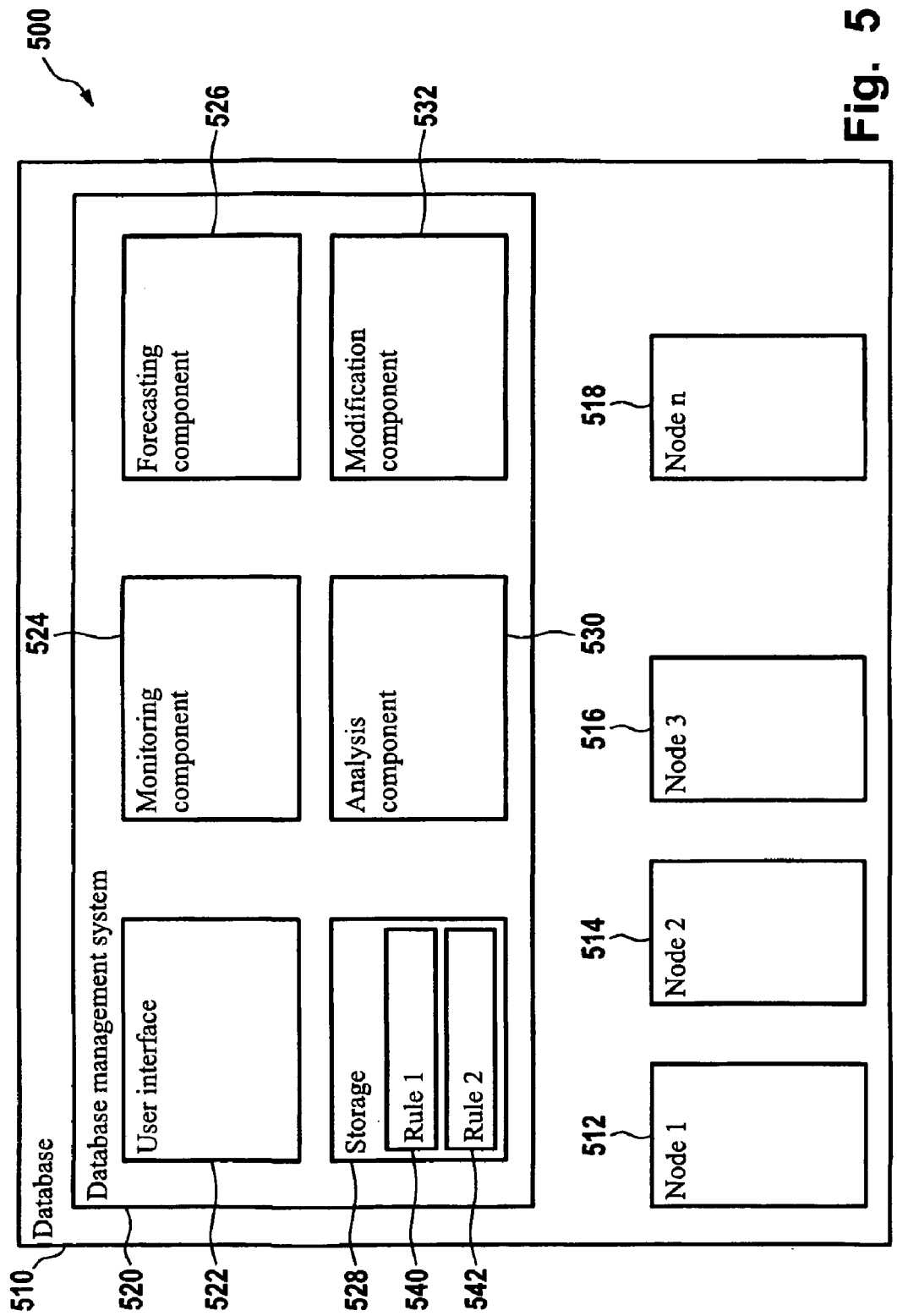
FIG. 5 shows a block diagram of a data processing system.

FIG. 5 shows a block diagram of data processing system 500. Data processing system 500 comprises database 510. Database 510 comprises nodes 512, 514, and 516. Node 518 may be added to database 500 in the event that it is required. Database 510 is managed by database management system 520. Database management system 520 comprises user interface 522, monitoring component 524, forecasting component 526, storage 528, analysis component 530 and modification component 532.

Monitoring component 524 monitors nodes 512, 514 and 516 to determine resource usage. Forecasting component 526 uses the monitored resource usage data to predict future resource usage as forecast resource usage data. The forecast resource usage data is used by analysis component 530 to determine whether a modification of the nodes of database 510 is necessary.

Analysis component 530 uses rules 540 and 542 stored in storage 528 to determine whether modification is necessary and to determine a suitable timeframe for the modification. Rule 540 may be used to determine if a modification is necessary. Rule 540 may specify a first resource usage threshold which if exceeded indicates that a modification of database 510 is required. Rule 540 may additionally specify a first time threshold; the modification of database 510 may be deemed necessary if the resource usage exceeds the first resource usage threshold for at least the first time threshold.

Rule 542 is used by analysis component 530 to determine a time window such as 434, 436 and 438 shown in FIG. 4 suitable for carrying out the modification of database 510. Rule 542 may specify a second resource usage threshold and a second time period required to modify the database, a time window would then be deemed as suitable if the resource usage was below the resource usage for at least the second time period.

Storage 540 may store additional more complex rules to be used by analysis component 530 to determine whether a modification of database 510 is necessary. For example, a rule may include combination of different resource usages such as 'if the hard disk usage is greater than 90% for more than 1 hour OR if the CPU load is greater than 95% for more than 30 minutes'.

Once analysis component 530 has determined that a modification is required, the modification is carried out by modification component 532 by for example adding node 518 to database 510 in the time window determined by analysis component 530.

The modification may be carried out automatically without user intervention, or alternatively, a user may receive a notification or a prompt to carry out the modification through user interface 522.

Methods and systems consistent with embodiments of the invention may be implemented on clustered computer systems such as high availability clusters that run on an active/passive mode. In such a system, the nodes run in different modes so that if one of the nodes breaks down another node will be activated and will take over the load of the first one. Such clusters are called active/passive or active/standby high availability clusters. The event of moving the load from one node to another will result in some downtime and therefore the above described method provides the advantage that the effects of this downtime can be minimized.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer readable medium include a semiconductor or solid state memory, magnetic tape, a removable computer diskette, a random access memory (RAM), a read only memory (ROM), a rigid magnetic disc and an optical disc. Current examples of optical disks include compact disc—read only memory (CD-ROM), compact disc—read/write (CD-R/W) and DVD.

A data processing system suitable for storing and/or executing computer program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc) can be coupled to the system either directly or through intervening I/O controllers.

Network adapters may also be coupled to the system to enable the data processing system to become coupled to other data processing systems or remote printers or storage devices through intervening, private or public networks. Modems, cable modems, and Ethernet cards are just a few of the currently available types of network adapters.

The invention claimed is:

1. A method of modifying a cluster in a data processing system, the cluster comprising a plurality of nodes, the method comprising:
   monitoring resource usage over at least one cycle of a periodic timeframe to obtain monitored resource usage data;
   forecasting resource usage over a future cycle of the periodic timeframe using the monitored resource usage data to obtain forecast resource usage data;
   analysing the forecast resource usage data using at least a first rule to determine whether a modification of the cluster is necessary and at least a second rule to determine a time window for the modification of the cluster; and
   performing the modification of the cluster by adding or removing a node to the plurality of nodes in the time window.

2. The method of claim 1, further comprising the step of providing a suggested timeframe for the modification to a user.

3. The method of claims 1, wherein the first rule comprises a first threshold value of said resource usage, the modification of the cluster being deemed necessary if a value of the forecast resource usage data exceeds the first threshold.

4. The method of claim 3, wherein the first rule further comprising a first time period, the modification of the cluster being deemed necessary if the forecast resource usage exceeds the first threshold for at least the first time period.

5. The method of claim 1, wherein the second rule comprises a second threshold value of the resource usage and a second time period, wherein the time window is a part of the forecast resource usage data where the resource usage is below the second threshold for at least the second time period.

6. The method of claim 1, wherein the cluster is a shared nothing cluster.

7. A computer program product comprising a tangible computer useable storage device having encoded thereon:
   computer executable program code for monitoring resource usage over at least one cycle of a periodic timeframe to obtain monitored resource usage data;
   computer executable program code forecasting resource usage over a future cycle of the periodic timeframe using the monitored resource usage data to obtain forecast resource usage data;
   computer executable program code analysing the forecast resource usage data using at least a first rule to determine whether a modification of the cluster is necessary and at least a second rule to determine a time window for the modification of the cluster; and
   computer executable program code performing the modification of the cluster by adding or removing a node to the plurality of nodes in the time window.

8. A data processing system for modifying a cluster, said cluster comprising a plurality of nodes, the data processing system comprising:
   a processor;
   a memory operably associated with the processor; and
   a program of instruction encoded on the memory and executable by the processor, the program of instruction comprising:
      program instructions for monitoring resource usage over at least one cycle of a periodic timeframe to obtain monitored resource usage data;
      program instructions for forecasting resource usage over a future cycle of the periodic timeframe using the monitored resource usage data to obtain forecast resource usage data;
      program instructions for analyzing the forecast resource usage data using at least a first rule to determine whether a modification of the cluster is necessary and at least a second rule to determine a time window for the modification of the cluster;

program instructions for performing the modification of the cluster by adding or removing a node to the plurality of nodes in the time window.

9. The data processing system of claim 8, wherein the program of instruction further comprises program instructions for providing a suggested timeframe for the modification to a user.

10. The data processing system of claim 8, wherein the first rule comprises a first threshold value of the resource usage, the modification of the cluster being deemed necessary if a value of the forecast resource usage data exceeds the first threshold.

11. The data processing system of claim 10, wherein the first rule further comprising a first time period, the modification of the cluster being deemed necessary if the forecast resource usage exceeds the first threshold for at least the first time period.

12. The data processing system of claim 8, wherein the second rule comprising a second threshold value of the resource usage and a second time period, wherein the time window is a part of the forecast resource usage data where the resource usage is below the second threshold for at least the second time period.

13. The data processing system of claim 8, wherein the cluster is a shared nothing cluster.

14. A data processing system for managing a cluster, the cluster comprising a plurality of nodes, the data processing system comprising:
  a monitoring component for monitoring a resource usage over at least one cycle of a periodic timeframe to obtain monitored resource usage data;
  a forecasting component for forecasting resource usage over a future cycle of the periodic timeframe using the monitored resource usage data to obtain forecast resource usage data;
  storage having stored thereon at least a first rule and a second rule;
  an analysis component for analyzing the forecast resource usage data using the first rule to determine whether a modification of the cluster is necessary and the second rule to determine a time window for the modification of cluster;
  a modification component for performing the modification of the cluster by adding or removing a node to the plurality of nodes in the time window.

15. The data processing system of claim 14, further comprising a user interface for providing a suggested timeframe for the modification to a user.

16. The data processing system of claim 14, wherein the first rule comprises a first threshold value of the resource usage, the modification of the cluster being deemed necessary if a value of the forecast resource usage data exceeds the first threshold.

17. The data processing system of claim 16, wherein said first rule further comprising a first time period, the modification of the cluster being deemed necessary if the forecast resource usage exceeds the first threshold for at least the first time period.

18. The data processing system of claim 14, wherein the second rule comprising a second threshold value of the resource usage and a second time period, wherein the time window is a part of the forecast resource usage data where the resource usage is below the second threshold for at least the second time period.

19. The data processing system claim 14, wherein the cluster being a shared nothing cluster.

* * * * *